(12) United States Patent
McGovern et al.

(10) Patent No.: US 12,077,072 B2
(45) Date of Patent: Sep. 3, 2024

(54) SEMI-ACTIVE SEAT SUSPENSION SYSTEM

(71) Applicant: USSC ACQUISITION CORP., Exton, PA (US)

(72) Inventors: John-Paul McGovern, Chester Springs, PA (US); Matthew M. Riley, West Chester, PA (US); Tyson Coey, Bolton, MA (US); Thomas Matthew Freed, Royersford, PA (US); Antonio Sangermano, Holliston, MA (US); Joseph Mirabile, Norristown, PA (US)

(73) Assignee: USSC ACQUISITION CORP., Exton, PA (US)

( * ) Notice: Subject to any disclaimer, the term of this patent is extended or adjusted under 35 U.S.C. 154(b) by 0 days.

(21) Appl. No.: 17/981,076

(22) Filed: Nov. 4, 2022

(65) Prior Publication Data

US 2023/0146328 A1 May 11, 2023

Related U.S. Application Data

(60) Provisional application No. 63/276,252, filed on Nov. 5, 2021.

(51) Int. Cl.
*B60N 2/50* (2006.01)
*B60N 2/52* (2006.01)

(52) U.S. Cl.
CPC ............. *B60N 2/501* (2013.01); *B60N 2/508* (2013.01); *B60N 2/502* (2013.01); *B60N 2/505* (2013.01); *B60N 2/507* (2013.01); *B60N 2/525* (2013.01)

(58) Field of Classification Search
CPC ........ B60N 2/501; B60N 2/508; B60N 2/502; B60N 2/505; B60N 2/507; B60N 2/54
See application file for complete search history.

(56) References Cited

U.S. PATENT DOCUMENTS

| | | | | |
|---|---|---|---|---|
| 5,169,112 A * | 12/1992 | Boyles | ................... | B60N 2/508 248/421 |
| 5,975,508 A * | 11/1999 | Beard | ................... | B60N 2/502 296/190.07 |
| 6,120,082 A * | 9/2000 | Vandermolen | ......... | B60N 2/508 296/68.1 |
| 9,809,136 B2 * | 11/2017 | Haller | ................... | B60N 2/508 |
| 2013/0206949 A1 * | 8/2013 | Archambault | ......... | B60N 2/508 248/421 |
| 2015/0232004 A1 * | 8/2015 | Haller | .................. | B60N 2/0244 248/560 |

FOREIGN PATENT DOCUMENTS

CN 208646664 U * 3/2019

* cited by examiner

*Primary Examiner* — Tan Le
(74) *Attorney, Agent, or Firm* — Faegre Drinker Biddle & Reath LLP

(57) ABSTRACT

Provided is a semi-active seat suspension system that minimizes vibration and energy transmission from a vibration/energy source, such as a motor vehicle, to a seated occupant by means of a spring and computer-controlled damper suspension system. Using a variety of sensors to determine an ideal damping rate at a given point in time, the system adjusts the damping rate in real time to provide the best possible ride to the occupant given the constraints of the system.

3 Claims, 7 Drawing Sheets

SEMI-ACTIVE SEAT SUSPENSION SYSTEM

CROSS-REFERENCE TO RELATED APPLICATIONS

This application claims the priority benefit of U.S. Provisional Application No. 63/276,252, filed Nov. 5, 2021, which is incorporated herein by reference in its entirety.

TECHNICAL FIELD

The present disclosure relates generally to vehicle seats and, more particularly, to a seat system that uses a spring and computer-controlled damper suspension system.

BACKGROUND

Seat suspension systems in vehicles typically consist of a mechanical constraint system (e.g., scissor system, 4-bar linkage, etc.). This constraint system consists of rigid structural elements, bearings, hardware, and lubrication to allow the seat, and thus a seated occupant, to move vertically, relative to the vehicle itself within the constraints of the seat suspension. Typically, such suspensions only allow vertical travel and not side-to-side or fore-aft travel.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

The present disclosure provides a means for producing a seat system that minimizes vibration and energy transmission from a vibration/energy source, such as a motor vehicle, to a seated occupant by means of a spring and computer-controlled damper suspension system. Using a variety of sensors to determine an ideal damping rate at a given point in time, the computer adjusts said damping rate in real time to provide the best, safest and least injurious possible ride to the occupant given the constraints of the system. This is accomplished to a degree not previously demonstrated in over-the-road vehicles by means of a very low friction mechanical suspension and a damper system and geometry of very low minimum damping. As such, both above-resonance vibration and on-resonance energy transmission to the occupant are minimized by means of appropriate damping rate application.

In an embodiment, a seat suspension system for a vehicle comprises: a top plate; a bottom plate; a scissor assembly arranged between the top plate and the bottom plate and moveably connecting the top plate with the bottom plate, wherein the scissor assembly is adapted to move the top plate relative to the bottom plate; a semi-active damper; an air spring; a height adjustment manifold; a height adjustment controller configured to control the height adjustment manifold to add or remove air from the air spring; and a damper controller configured to control the semi-active damper to apply damping to the suspension system.

Further scope of applicability of the systems and apparatuses of the present disclosure will become apparent from the more detailed description given below. However, it should be understood that the following detailed description and specific examples, while indicating embodiments of the systems and apparatuses are given by way of illustration only, since various changes and modifications within the spirit and scope of the concepts disclosed herein will become apparent to those skilled in the art from the following detailed description.

DRAWINGS

While the appended claims set forth the features of the present techniques with particularity, these techniques may be best understood from the following detailed description taken in conjunction with the accompanying drawings of which:

DETAILED DESCRIPTION

Figure 1:
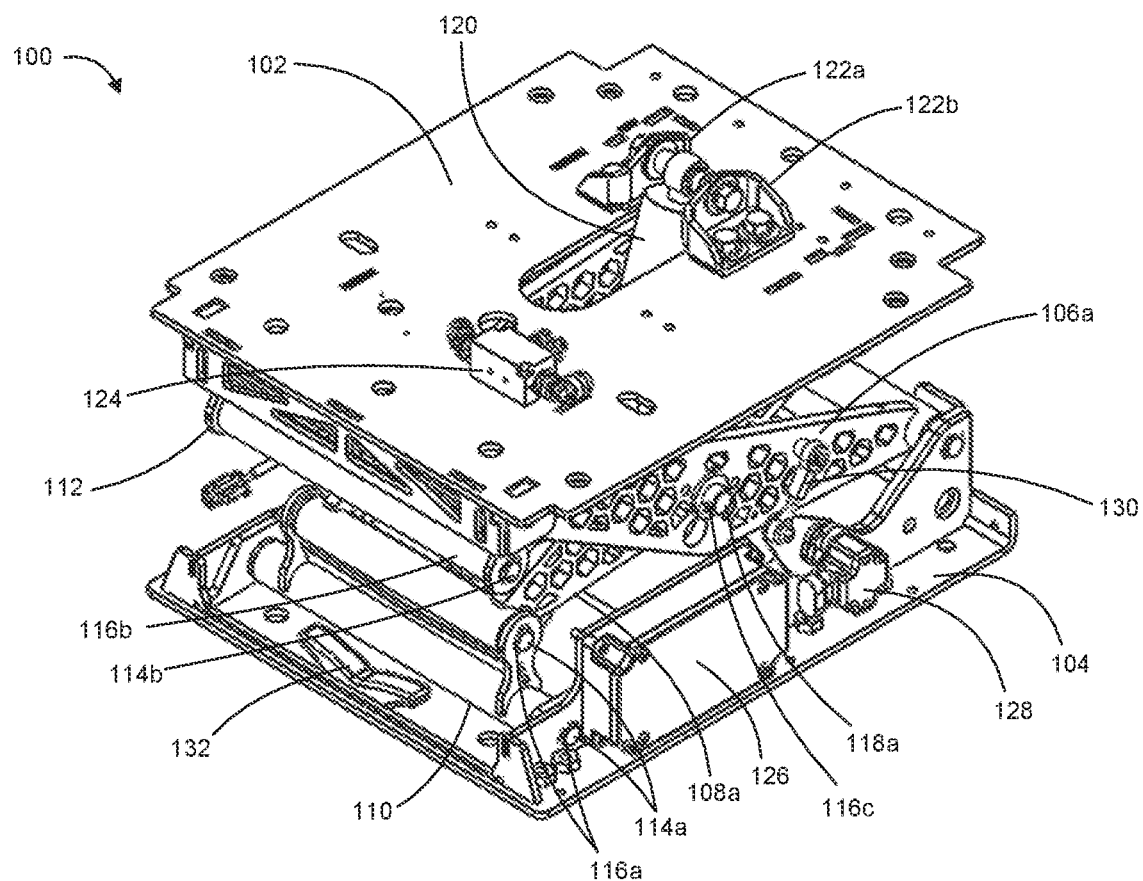
FIG. 1 is a front perspective view of a seat suspension system according to an embodiment described herein.
Figure 2:
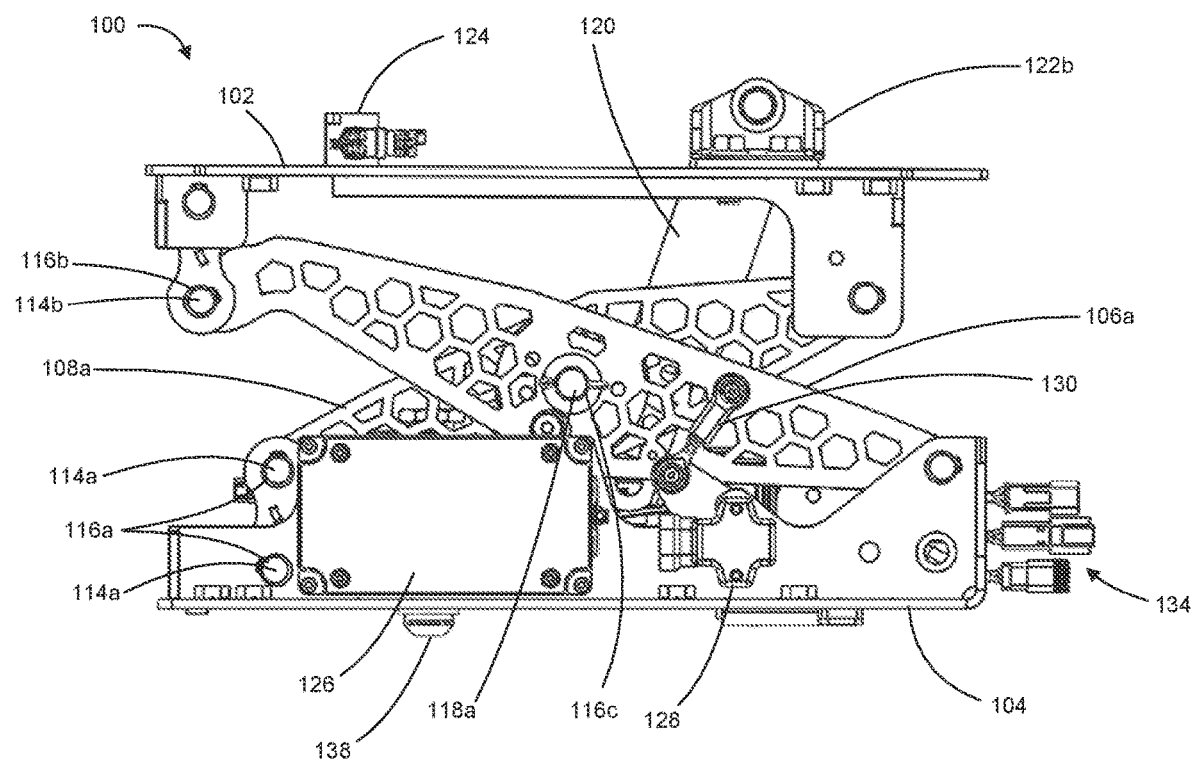
FIG. 2 is a side elevation view of the seat suspension system shown in FIG. 1.
Figure 3:
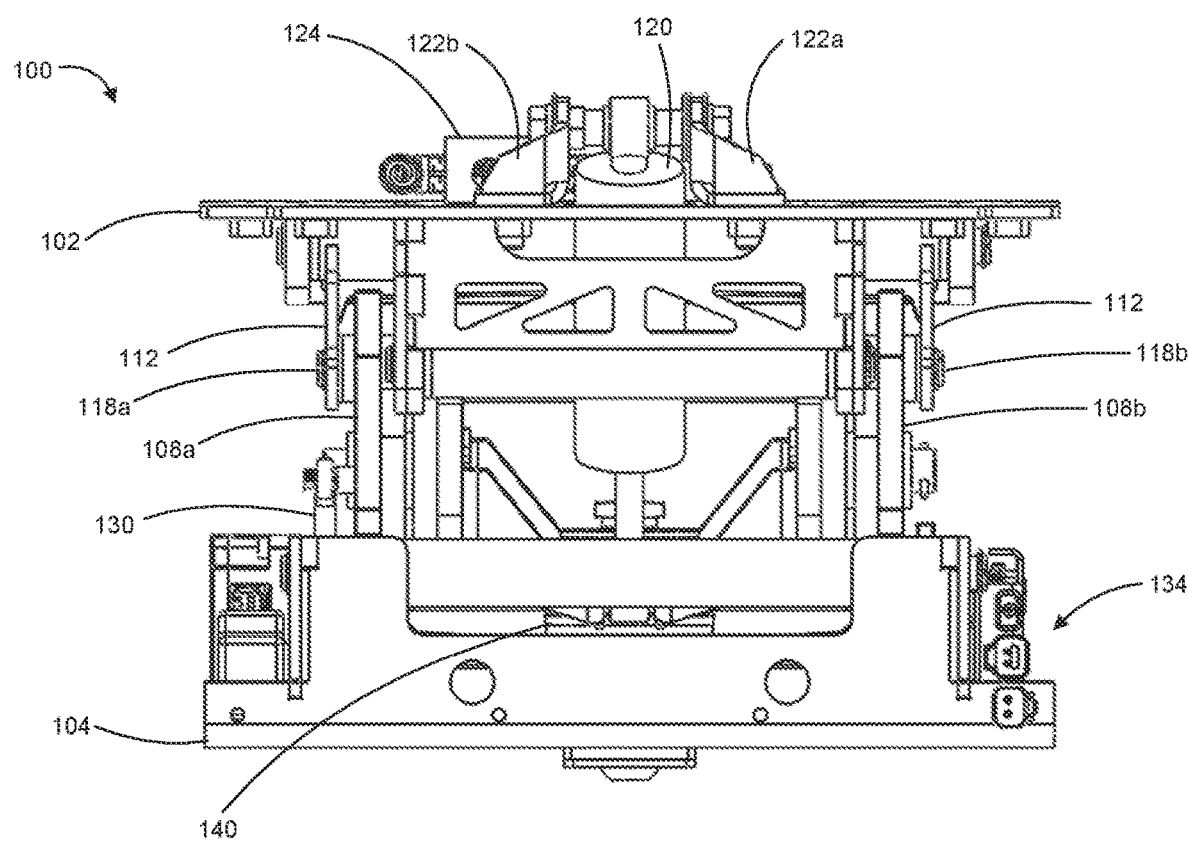
FIG. 3 is a back elevation view of the seat suspension system shown in FIG. 1.
Figure 4:
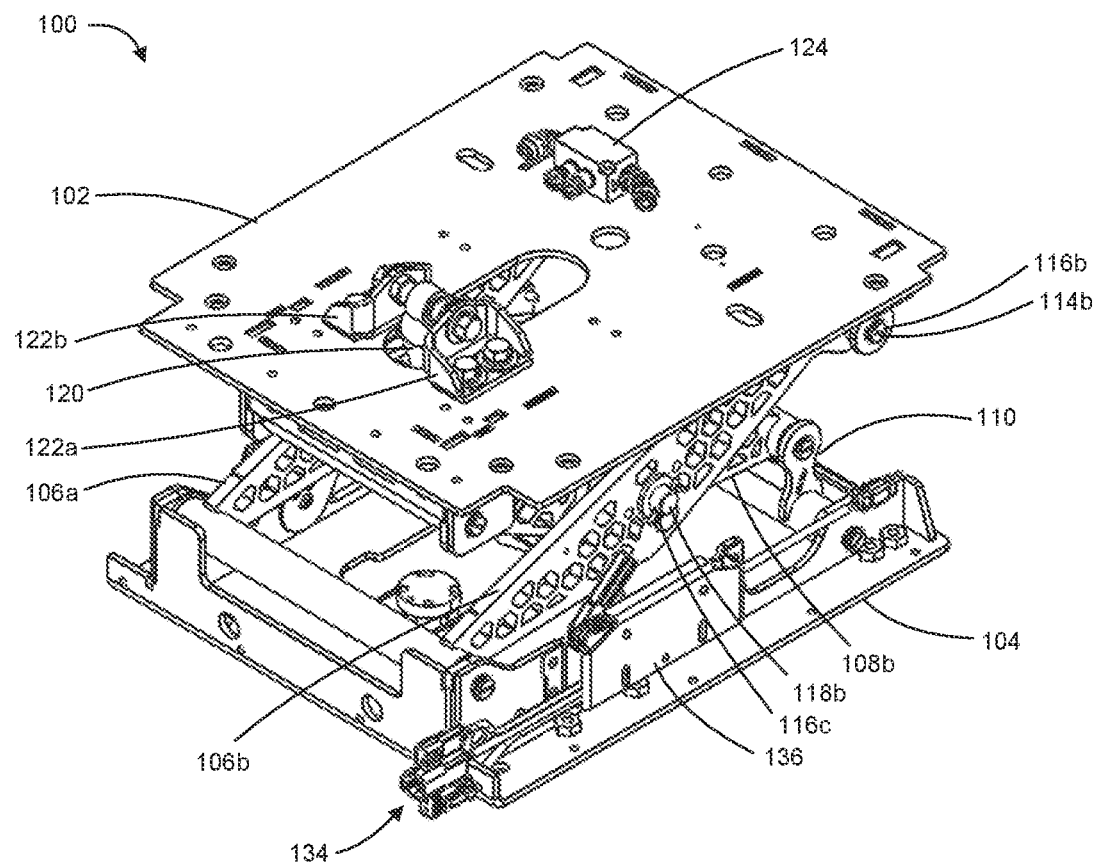
FIG. 4 is a back perspective view of the seat suspension system shown in FIG. 1.
Figure 5:
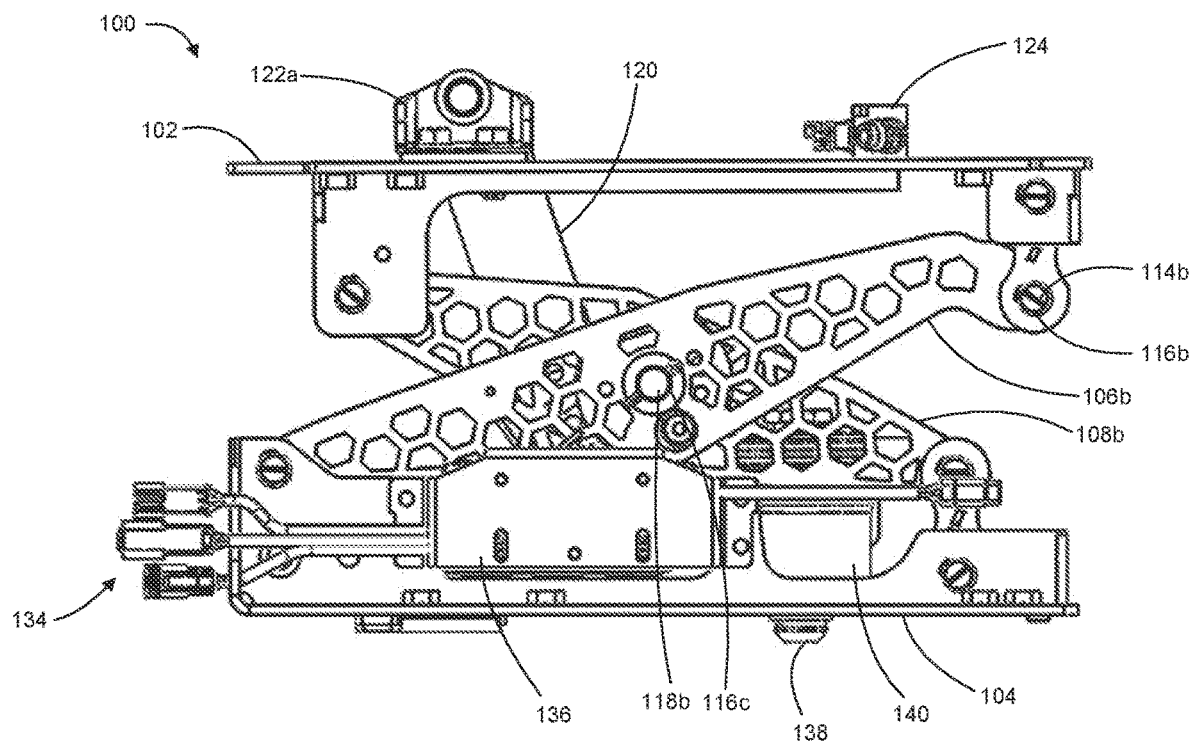
FIG. 5 is a side elevation view of the seat suspension system shown in FIG. 1.
Figure 6:
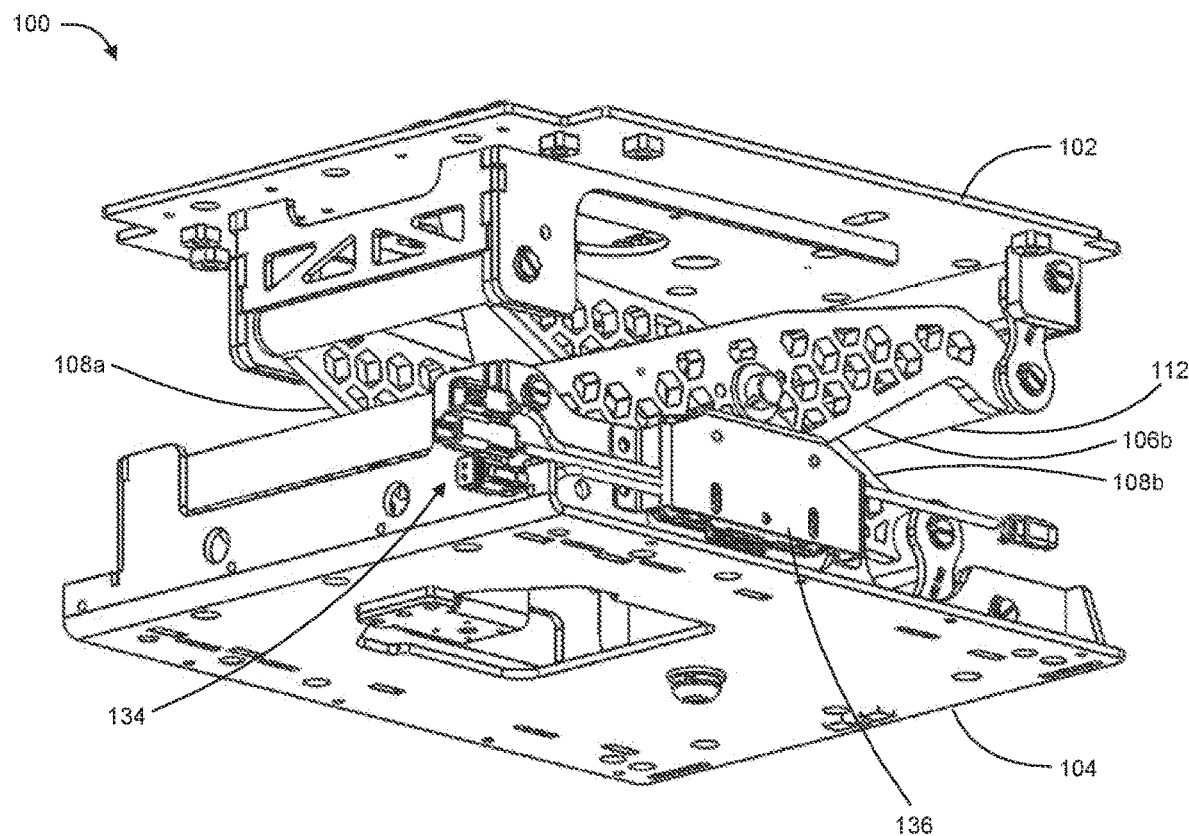
FIG. 6 is a back perspective view of the seat suspension system shown in FIG. 1.

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

With vertical travel allowed, the most common means of occupant weight suspension is by air spring. Mechanical springs such as coil, torsion, or leaf springs may also be used. In addition to the spring element, a damper or shock absorber or mechanical dashpot is generally also used to slow down suspension and occupant movement in large energy input instances or instances of high vibration. With both of these spring and damper elements as passive devices, there are significant trade-offs to be made between performance and occupant safety. With performance defined as the softness and comfort of the user experience, and occupant safety and health centered around both the prevention of hard bottom-out and top-out events and the shock to the human body that can result, as well as the minimization of whole-body vibration energy imparted to the occupant, typical passive seat suspension design must prioritize safety often at the expense of performance.

The use of semi-active damper systems in seat suspensions allows a greater design space for engineers to improve performance while maintaining safety. However, existing commercially available semi-active damper systems have limitations all their own. One particular limitation is that of a "sticking" of the damper at change of stroke direction, or in technical terms, a non-zero damping rate at zero damper velocity. The result of this limitation is the feeling of a "hitch" or sticking of the suspension at any change of direction, which happens quite often as a result of vehicle motion. The effect of this hitch or sticking is the perception of reduced performance and comfort by the seat occupant.

In view of the aforementioned limitations of existing damper systems in seat suspensions, embodiments of the present disclosure provide a means for producing a seat system that minimizes vibration and energy transmission from a vibration/energy source, such as a motor vehicle, to a seated occupant by means of a spring and computer-controlled damper suspension system. Using a variety of sensors to determine an ideal damping rate at a given point in time, the computer adjusts said damping rate in real time to provide the best possible ride to the occupant given the constraints of the system. This is accomplished to a degree not previously demonstrated in over-the-road vehicles by means of a very low friction mechanical suspension and a damper system and geometry of very low minimum damping. As such, above-resonance vibration is transmitted only minimally to the occupant and on-resonance energy transmission is minimized by means of appropriate damping rate application.

Referring to FIGS. 1-6, a semi-active seat suspension system 100 is illustrated. In at least one embodiment, the semi-active seat suspension system 100 includes a top plate 102 and a bottom plate 104. One or both of the top plate 102 and the bottom plate 104 may be a weldment (assembly of components welded together). A nested scissor mechanism (assembly) is used in the semi-active seat suspension system 100, including an outer scissor assembly comprising outer scissor arms 106a and 106b, an inner scissor assembly comprising inner scissor arms 108a and 108b, a lower slewing arm assembly 110, and an upper slewing arm assembly 112. Such a nested scissor mechanism allows for low collapsed height but high total travel. Ring clips may be used on the ends of the rods for minimum package width with maximum suspension stability/stance, in an embodiment. The lower slewing arm assembly 110 may include a pair of bearing rods 114a, each supported by a corresponding pair of bearings 116a. The upper slewing arm assembly 112 may include a pair of bearings rods 114b supported by a pair of bearings 116b. The outer scissor arm 106a and the inner scissor arm 108a may be connected via a scissor center pin 118a supported by a bearing 116c, and the outer scissor arm 106b and the inner scissor arm 108b may be connected via a scissor center pin 118b supported by a bearing 116c. Bearing rods may also connect the scissor assembly to the slewing arms and top and bottom plates.

The semi-active seat suspension system 100 also includes an air spring 140 (shown without the bladder), an air spring bottom mount screw 138, and a semi-active damper 120. The semi-active damper 120 is mounted to the top plate 102 by a left top mount 122a and a right top mount 122b. In some embodiments, the left top mount 122a and the right top mount 122b together form a compliant damper mount housing. The left top mount 122a and the right top mount 122b may each contain or be connected to the damper by an engineered polymer damper mount, in an embodiment. Also mounted to the top plate 102, but also optionally mounted elsewhere, is a height adjustment manifold 124. Mounted to the bottom plate 104, but also optionally mounted else-where, is a height adjustment electronic control unit (ECU) 126. A bump stop 132 is also mounted to the bottom plate 104 in an embodiment.

In an embodiment, the semi-active seat suspension system 100 may receive inputs from a user interface switch (e.g., one of user interface switch 206 and 210 in the example system shown in FIG. 7, described in more detail below), which may be mounted elsewhere in the seat or seat system. The user interface switch may be configured to allow the seat occupant to select from a plurality of operation modes for the seat suspension system 100. For example, the occupant may be able to select (via the user interface switch) between a centering mode, a wide band adjustment mode, and a full height adjustment mode. It should be noted that regardless of the height adjust system position, the damper ECU (described in greater detail below) may be always running and attempting to optimize ride quality. This may be intentional in order to provide the best possible ride to the user at all times, even when the user may think that the system is "off" (e.g., in "full height adjustment mode", below).

A first mode of operation (which may be referred to as the "centering mode" or "centering mode of operation") is configured to maintain the suspension at its mid-travel height no matter what. The suspension system is allowed to oscillate around this center position, but if it deviates from center for more than a prescribed amount of time (e.g., one second, two seconds, etc.), the height adjustment ECU 126 directs the height adjustment manifold 124 to add or remove air from the air spring 140. This could happen due to a change of occupant, increase of occupant weight on the seat (e.g., lifting of legs, etc.), and the like.

A second mode of operation (which may be referred to as the "wide band adjustment mode" or "wide band adjustment mode of operation") is configured to allow the user to adjust the height of the suspension away from center, but not fully to the end stops. This allows the damper ECU 136 to still have some benefit if the user wants to ride the suspension relatively low or high. In an example, settings for the wide band adjustment mode may be to keep the user 1-1.5 inches away from the end stops.

A third mode of operation (which may be referred to as the "full height adjustment mode" or "full height adjustment mode of operation") allows the user to set the height to any desired position, including riding the system on the full bottom end stop with the air spring 140 fully deflated or fully topped out with the air spring 140 fully inflated to max vehicle system pressure.

The height adjustment ECU 126 is configured to implement a height adjust control algorithm, in an embodiment. In an example, the height adjustment ECU 126 monitors a suspension position sensor 128 (described in below) and the user interface switch. Based on inputs from the position sensor 128 and the user interface switch, with the mode of operation (described further below) determined by the user interface switch, the height adjustment ECU 126 directs the height adjustment manifold 124 to increase air pressure to the air spring 140 or to exhaust excess air pressure from the air spring 140. In doing so, the height adjustment ECU 126 is configured to control the height of the suspension to within a precise range, such as +/−0.25 inch (e.g., for the centering mode of operation). In the centering mode of operation, if the system drifts more than this predefined threshold from center (¼ of an inch in this example), air is either added to or exhausted from the system to re-establish equilibrium within the required setpoints. The same algorithm is applied in the wide band mode of operation, but the acceptable adjustment range is much wider.

The semi-active seat suspension system 100 may also receive inputs from an occupant seat sensor (not shown here and typically installed in or below the seat cushion). This sensor provides a signal to the height adjustment ECU 126 to disable the automatic height adjustment of the system when the seat is unoccupied. This is not required for proper function of the seat when occupied, but rather is a convenience feature that prevents the height adjustment ECU 126, if in centering mode or wide band mode from commanding the height adjustment manifold 124 to release air pressure in the air spring 140 when the seat is unoccupied. If this were to happen, when the seat were to be occupied again, the reduced air pressure would cause the occupant to compress the suspension near to or close to the full bottom position, after which the height adjustment ECU 126 would command to add air to the air spring 140 via the height adjustment manifold 124. The occupant seat sensor removed the need for this cycle when the seat become unoccupied and then reoccupied.

In one or more embodiments, the semi-active seat suspension system 100 may include one or more integrated electronic sensors or actuators. For example, the semi-active seat suspension system 100 may include one or more position sensors 128. Although not shown, the semi-active seat suspension system 100 may also include one or more pneumatic pressure sensors, top and bottom pan accelerometers, pneumatic solenoid valves (e.g., for airbag control), connecting hoses and tubing, connecting wiring and connectors, and/or other sensors or actuators as appropriate. The position sensor 128 is optionally attached to the bottom plate 104 and includes a position sensor armature linkage 130, which is attached at one end to the position sensor 128 and attached at an opposite end to the outer scissor assembly 106a. The position sensor 128 is configured to measure the position of the top plate 102 of the suspension relative to the bottom plate 104. In other words, the position sensor 128 is configured to measure how "open" or "closed" the nested scissor mechanism is. The armature linkage 130 is specifically designed to provide a sufficiently large range of motion to provide the fidelity of signal to the height adjustment ECU 126 required for the precise damper control embodied by the present invention. The information (e.g., measurements) obtained by the position sensor 128 is used by a damper ECU 136 to determine how much damping to apply to the system. For example, when the top plate 102 and the bottom plate 104 are nearing the furthest distance apart from one another (the scissor mechanism is almost fully "open"), the damper ECU 136 may determine, based on the measurement data provided by the position sensor 128, to apply increased damping to prevent a hard top. Similarly, when the top plate 102 and the bottom plate 104 are nearing the shortest distance apart from one another (the scissor mechanism is almost fully "closed"), the damper ECU 136 may determine, based on the measurement data provided by the position sensor 128, to apply increased damping to prevent a hard bottom out.

In accordance with one or more embodiments of the present disclosure, the semi-active seat suspension system 100 is very low friction. Each of bearing rods 114a and 114b may be full-width bearing rods, which allows for increased assembly speed and increased system mechanical stability. A specialized design and weld pattern may be used in manufacturing the system 100 so as to minimize heat distortion and provide for maximized component and bearing alignment and system performance.

In an embodiment, the compliant damper top mount 122a and 122b may be an engineered polymer damper mount with tuned compliance to overcome parasitic friction inherent with all dampers, but of particular importance in applications such as the present disclosure. In an embodiment, the semi-active seat suspension system 100 may provide for the ability to tune resistance by tightening or loosening the mounting screws.

In at least one embodiment, the damper ECU 136 is connected by a plurality of wires 134 to various other components in the vehicle. The damper ECU 136 is configured with various safety features. For example, the damper ECO 136 may be configured for redundant actuation of pneumatics, protected (secure) actuation of pneumatics, and/or failsafe MR damper driver.

Figure 7:
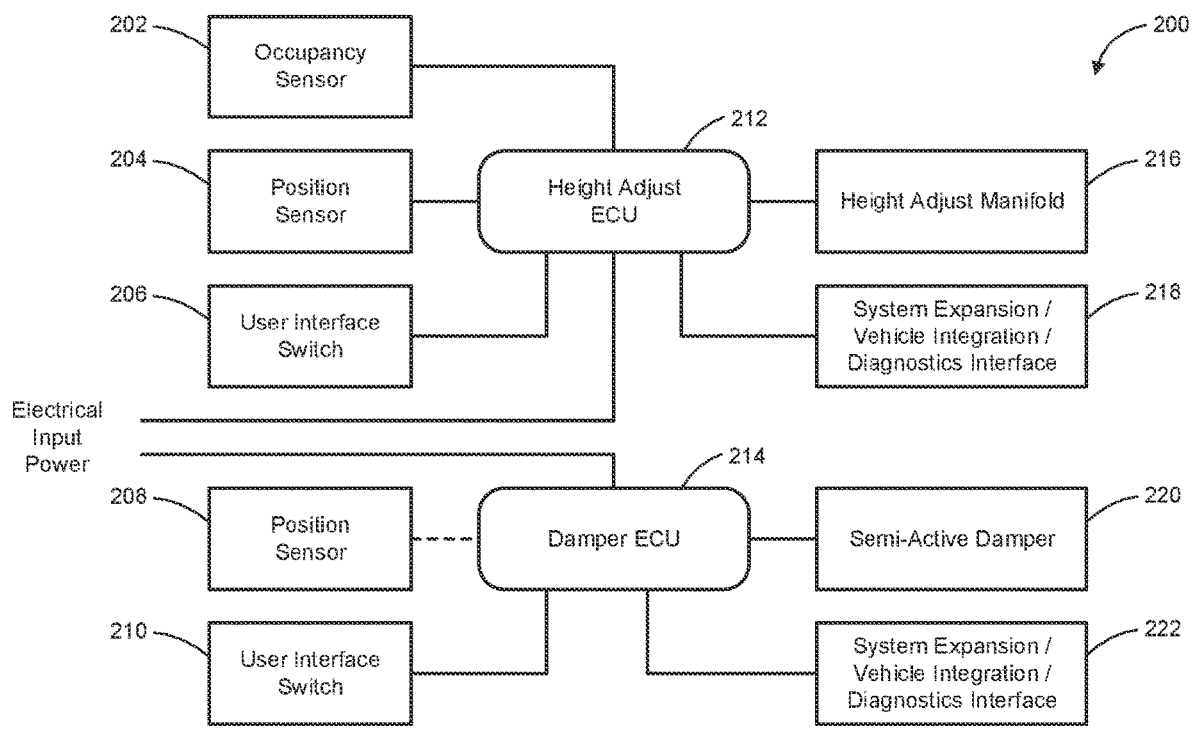
FIG. 7 is a block diagram illustrating electrical system components of a seat suspension system according to an embodiment described herein.

FIG. 7 is a block diagram illustrating components of an electrical system 200 for a semi-active seat suspension system, in accordance with an embodiment described herein. As shown, the electrical system 200 may include a height adjustment ECU 212 (which may be the same as height adjustment ECU 126 shown in FIGS. 1-6 and described above) and a damper ECU 214 (which may be the same as damper ECU 136 shown in FIGS. 1-6 and described above). Each of the height adjustment ECU 212 and the damper ECU 214 may receive electrical input power from, for example, a battery or other power source of the vehicle.

In an embodiment, the height adjustment ECU 212 may be in electrical connection with an occupancy sensor 202, a position sensor 204, a user interface switch 206, a height adjustment manifold 216, and a system expansion/vehicle integration/diagnostics interface 218. The position sensor 204 and height adjustment manifold 216 may be the same as position sensor 128 and height adjustment manifold 124, respectively, shown in FIGS. 1-6 and described above, in one example. In an embodiment, the damper ECU 214 may be in electrical connection with a position sensor 208, a user interface switch 210, a semi-active damper 220, and a system expansion/vehicle integration/diagnostics interface 222. The position sensor 208 and semi-active damper 220 may be the same as position sensor 128 and semi-active damper 120, respectively, shown in FIGS. 1-6 and described above, in an example. In one embodiment, the position sensor 208 may be integrated with the damper ECU 214. In another embodiment, the position sensor 208 may be a separate component from the damper ECU 214. In some embodiments, one or more accelerometers (not shown) may also be integrated with or in wired connection with one or both of height adjustment ECU 212 and damper ECU 214. In some embodiments, position sensor 204 and position sensor 208 may be the same component, while in other embodiments, position sensor 204 and position sensor 208 may be separate components.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A seat suspension system for a vehicle, the seat suspension system comprising:
   a top plate;
   a bottom plate;
   a scissor assembly arranged between the top plate and the bottom plate and moveably connecting the top plate with the bottom plate, wherein the scissor assembly is adapted to move the top plate relative to the bottom plate;
   a semi-active damper;
   an air spring;
   a position sensor configured to measure a position of the top plate relative to the bottom plate;
   an accelerometer to measure acceleration input into the seat suspension system from the vehicle;
   a user interface switch configured to receive a selection of a mode of operation, of a plurality of modes of operation, for the seat suspension system;
   a height adjustment manifold;
   a height adjustment controller configured to control the height adjustment manifold to add or remove air from the air spring based on (i) input from the position sensor and (ii) a selected mode of operation for the seat suspension system; and
   a damper controller configured to control the semi-active damper to vary the damping of the suspension system based on (i) input from the position sensor and (ii) the selected mode of operation.

2. The seat suspension system of claim 1, wherein the scissor assembly comprises a pair of outer scissor arms and a pair of inner scissor arms.

3. The seat suspension system of claim 1, wherein
   the pair of outer scissor arms comprises a first outer arm including a first end and a second end, wherein the first outer arm is pivotally attached to the top plate proximate to the first end, and
   the pair of inner scissor arms comprises a first inner arm including a first end and a second end, wherein the first inner arm is pivotally attached to the top plate proximate to the first end.

* * * * *